Oct. 30, 1962     H. BOBST ETAL     3,060,776
PRESSES FOR CUTTING SHEET MATERIAL
Filed May 21, 1956     2 Sheets-Sheet 2

United States Patent Office 3,060,776
Patented Oct. 30, 1962

3,060,776
PRESSES FOR CUTTING SHEET MATERIAL
Henri Bobst, Lausanne, and Josef Kury, Prilly, near Lausanne, Switzerland, assignors to J. Bobst & Son S.A., Prilly, near Lausanne, Switzerland, a corporation of Switzerland
Filed May 21, 1956, Ser. No. 586,018
Claims priority, application Switzerland May 24, 1955
5 Claims. (Cl. 83—103)

The present invention relates to presses for cutting sheet material, such as paper and cardboard, and particularly to presses in which sheets are conveyed by means of gripper bars guided between endless chains.

According to the present invention, a press comprises, beyond a working station where the cutting operation is performed, at least one station at which the sheets, held by their gripper bar, are at least partially relieved of their waste, said station or stations, known as ejection stations, preceding the station at which the grippers of the bars open.

The accompanying drawing illustrates an embodiment of the invention, by way of example, and two examples of the invention's application.

Figure 1A:
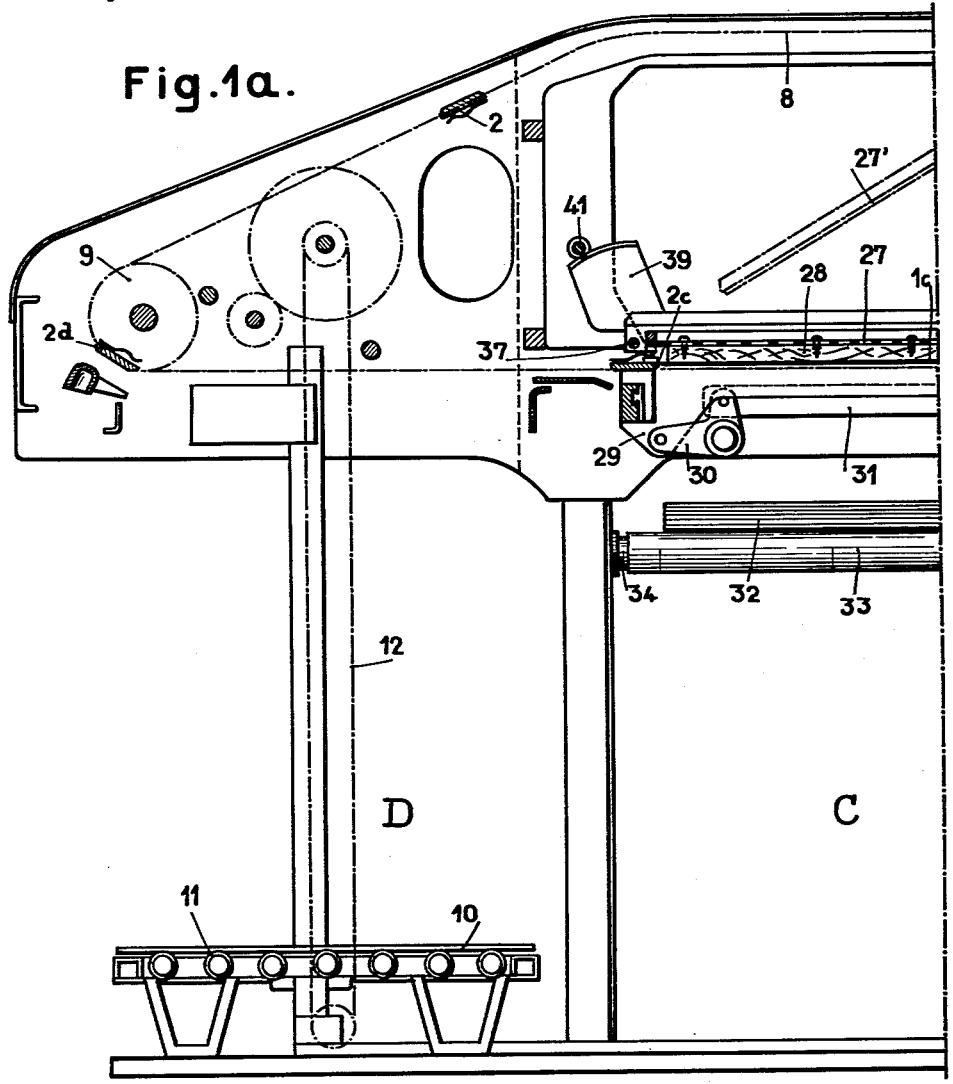
Figure 1B:
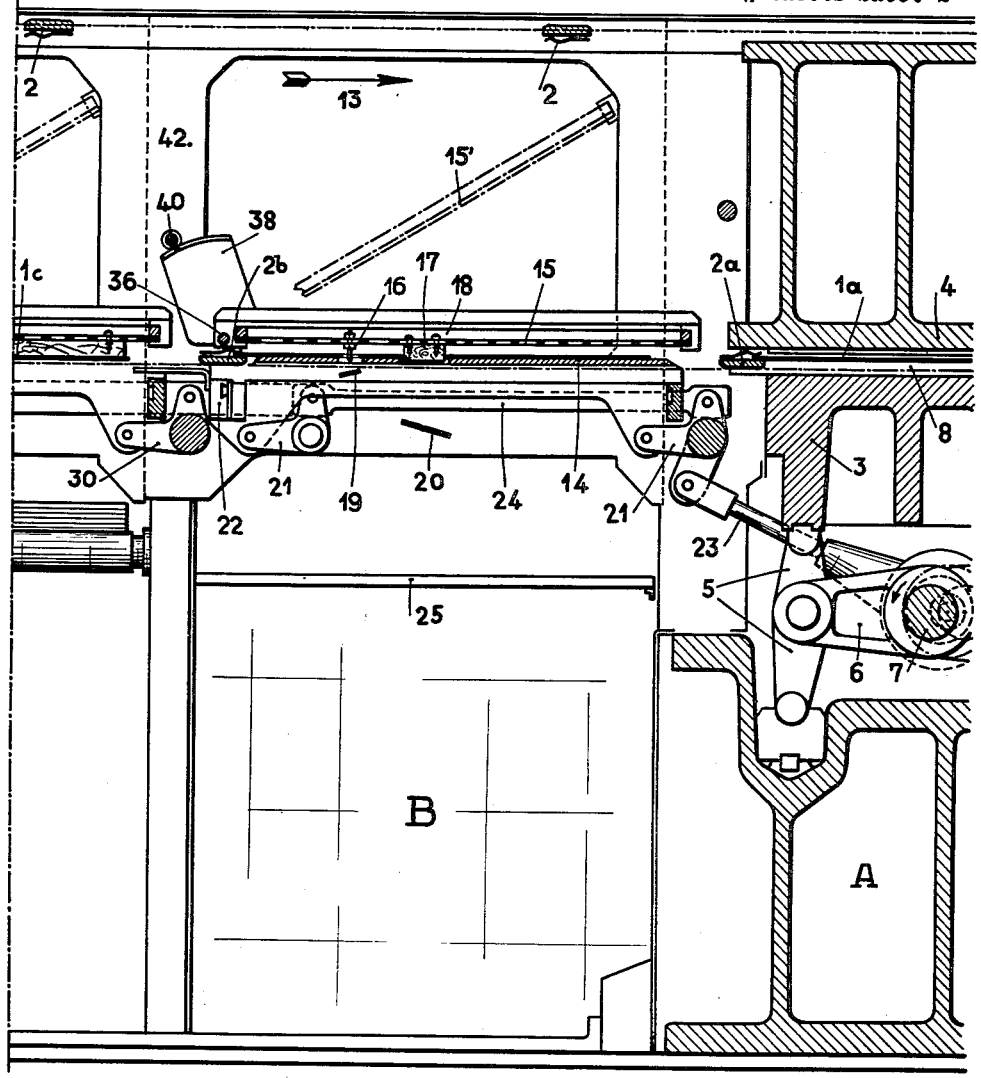

FIGS. 1a and 1b are longitudinal sections, shown in elevation, of the rear part of a press comprising two ejection stations.

Figure 2:
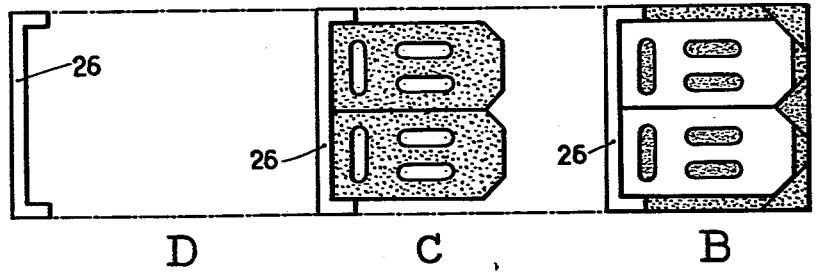

FIG. 2 diagrammatically illustrates a method utilizing two ejection stations.

Figure 3:
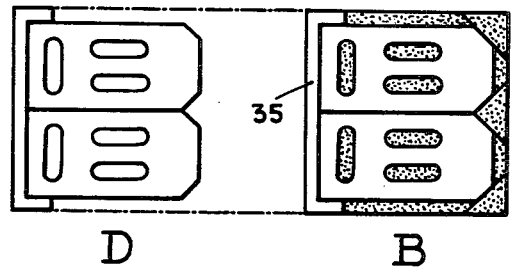

FIG. 3 diagrammatically illustrates a method which which makes use of only one ejection station.

The press illustrated in FIGS. 1a and 1b comprises a feed station (not shown) which is understood to be located to the right of the drawing. At the feed station, the sheets to be cut out are registered and gripped by gripper bars, whereupon they are conveyed by the latter successively through the working station A, the two ejection stations B and C and the receiving station D.

At the working station A, a pattern on the sheet 1a, held by gripper bar 2a, is cut out by the lower platen 3 rising against the upper stationary platen 4. This upward movement is caused by the operation of toggle 5 under the action of rods 6 keyed to the main motor shaft 7.

As for the gripper bars, they are driven through the press by a pair of endless chains 8. The latter are conveyed by chain wheels which are not shown, except for the rear pair of wheels 9 on which there is a gripper bar 2d in the receiving position.

At this station, which normally follows the working station so that a standard press of the type described comprises the elements A—D of the drawing, the cut-out sheets fall in a pile on the plate 10 which is mounted on the rollers 11 and kept automatically at the correct height by the lifting chains 12.

In accordance with the invention, two additional stations B and C are inserted between A and D. The gripper bars are stopped at 2b and 2c, while two other bars are at 2a (working station) and 2d (receiving station), as has already been described, and the empty bars 2 are distributed between the receiving station and the station (not illustrated) at which the registered sheets are gripped. The chains, longer than those in a standard press, thus circulate in the direction of the arrow 13.

The drawing shows the press at the moment of cutting; that is to say, the gripper bar 2a keeps the sheet 1a immobile while the platen 3 is at its top dead position and the platen, pressed against the sheet, cuts the same.

The gripper bar 2b, which is stopped at the ejection station B, holds there the previously cut-out sheet 1b between ejection members and a template which has ejection holes.

Said template is made from a board 14 which is cut out accordingly, while the ejection members are arranged in an appropriate position on an upper grating on grate member 15.

The ejection members which are protrusions comprise, in the present case, a threaded rod 16 held in position by nuts and a block 17 held by screw members 18, the said rod being designed to force a small piece of waste 19 and the said block a larger piece of waste 20 through the corresponding openings visible in the cross-section of the board 14.

This ejection is effected as follows:

The board 14 may occupy a bottom, lowered position and a top, raised position. In the drawing, it occupies the raised position.

In the lowered position it is located, like the moving platen 3 at its bottom dead point, beneath the trajectory of the gripper bars to which it gives free passage.

On rising, the plate 3 raises the bar which had stopped at 2a, but the board 14 rises at the same time and lifts with it the bar 2b, while, passing the lower level of the ejection members 16 and 17, it forces the latter to repel the waste and make it drop into the openings which are provided for the purpose and through which the said waste falls.

The raising of the board 14 is caused by the oscillation of the levers 21 supporting a frame member 22 on which said board is mounted. Such levers are provided on both sides of the frame, that is to say, also in front of the plane of the drawing. They are actuated by the rod 23 and interconnected by the coupling rod 24.

The fact that the rod 23 is actuated from an excenter on the main motor shaft 7 explains why the ejection of the waste from a sheet which has just been cut out is effected while the chains corresponding to the cutting out of the following sheet are stopped.

The pieces of waste 19, 20 fall on to an inclined ramp or board, the upper edge of which can be seen at 25 and which board conveys them to a position behind the plane of the drawing.

In the case illustrated the press is presumed to be working according to the method shown in FIG. 2 and which will be explained before the description of FIGS. 1a and 1b are continued.

In FIG. 2, a cut-out sheet can be seen above the reference letter B. Said sheet contains two identical parts, each having three oblong holes. The gripper bar holds this sheet by the edge 26 which constitutes a drop.

At the ejection station B, which has just been described, and supposing that the necessary ejection members are located under the grating 15, all the pieces of waste covered with dotted shading are evacuated, that is to say, the oblong holes and the edges except for the portion 26 held by the clamp bar.

What remains after this operation will have the profile of the piece shown in FIG. 2, reference letter C. This piece will pass, in the following cycle, to the evacuation position C in place of the sheet 1c shown in FIGS. 1a and 1b.

Here, the grating supporting a wooden block 28 profiled in accordance with the whole of the cut-out piece less the part retained by the clamp bar and the lower frame 29 leaves a corresponding gap. Said frame is raised, like the frame 22, by levers 20 which are acted upon by a coupling rod 31 connected to the bar 24 with which it is therefore synchronously displaced.

Reverting to the example shown in FIG. 2, the mechanism just described would, at the ejection station C, cause the part of C shaded by dots in FIG. 2, or, in other words, the cut-out pieces which it is desired to recover, to fall.

According to FIGS. 1a and 1b, said pieces fall in a pile 32 on to a transverse travelling belt 33, passing over the roller 34.

The gripper bar 2c, carrying the portion 26, will be moved to 2d in the following cycle and will deposit said portion at the receiving station.

In the example of work just described, the following successive operations are accomplished:

(1) A registered sheet is gripped by a gripper bar at the feed station (outside the drawing on the right);

(2) The sheet is cut out between the platen (at the station A);

(3) The waste, except for a portion gripped in the gripper bar, is evacuated (at 1b, station B);

(4) The cut-out and utilized pieces are evacuated and recovered (at station C);

(5) The last waste piece is released by the gripper bar (at 2d, station D).

In this case, no pile is formed on the plate 10.

It is also possible, however, to proceed differently either by providing to the press with only one ejection station before the receiving station, or by making one of the two ejection stations of the example described run idle.

FIG. 3 shows this process in detail:

The cut-out sheet reaches the ejection station B in FIG. 3. The ejection members remove from it all the parts covered with dots, i.e. the cut-out holes and the useless edge, with the exception of the portion 35 held by the grippers of the gripper bar.

The result is the profile illustrated by D in FIG. 3, which profile is brought by the gripper bar to the receiving station D and left in a pile on the plate 10. This is done according to the number of ejection stations, either directly or by passing through the second ejection station without undergoing any operation there.

The portion 35 is then removed by hand.

It would also be possible, depending on the number and profile of the cut-out holes, to remove the waste at two points partly at the station B and partly at the station C, or even to provide a larger number of ejection stations.

It should be noted that each of the gratings 15 and 27 rocks on a transverse shaft 36 or 37, which is integral with a toothed sector 38 or 39 respectively located on one of its edges. By means of handwheels (not shown) and shafts carrying pinions 40 or 41, respectively, the gratings can be raised to the inclined position, i.e. 15′ or 27′. This gives access to the sheets or to the template and facilitates the positioning of the ejection members and the checking of their proper functioning, and, finally, it enables waste that has not been properly evacuated to be removed.

The press illustrated in FIGS. 1a and 1b shows a frame 42 made in a single piece. It would also be possible to construct a separate frame for each of the stations B, C and D and to arrange them side by side, assembling them with the aid of, for instance, bolts. This would enable these elements to be combined as desired to form a simple press with only a receiving station and, finally, a press with several ejection stations, without large special frames requiring a set up for each case.

What is claimed is:

1. An ejector for ejecting cut-out portions of a sheet comprising a generally fixed grate member provided with spaced openings extending therethrough, a frame member, means coupled to said frame member to oscillate the same towards the grate member and maintaining the frame member parallel to said grate member, a template on said frame in parallel relationship to said grate member and having openings corresponding to said cut-out portions, protrusions detachably fastened to said grate member and extending through the openings therein, in correspondence with said openings in the template whereby to eject through said openings in the template the cut-out portions of said sheet, and means supporting said grate for selective pivotal movement to facilitate adjustment of said protrusions.

2. An ejector as claimed in claim 1 comprising means to register the cut-out portions with said openings in the template.

3. An ejector as claimed in claim 1 wherein at least one of said protrusions comprises a threaded rod extending through one of the openings of said grate member and nuts threadably engaging the rod and fastening the same to said grate member.

4. An ejector as claimed in claim 1 wherein at least one of said protrusions comprises a block and screw members holding the block on the grate member.

5. An ejector as claimed in claim 1 wherein said means comprises levers connected to opposite sides of said frame member, a rod rigidly connecting said levers, and a power source connected to one of said levers for oscillating said one lever and thereby the other of said levers to oscillate said frame member.

References Cited in the file of this patent

UNITED STATES PATENTS

| | | |
|---|---|---|
| 631,392 | Binder | Aug. 22, 1899 |
| 641,215 | Meisel | Jan. 9, 1900 |
| 1,489,339 | Banzett | Apr. 8, 1924 |
| 1,977,690 | Norem | Oct. 23, 1934 |
| 2,097,772 | Novick | Nov. 2, 1937 |
| 2,110,998 | McDaniels | Mar. 15, 1938 |
| 2,121,004 | Balfe | June 21, 1938 |
| 2,258,880 | Bobst | Oct. 14, 1941 |
| 2,289,252 | Dorweiler | July 7, 1942 |
| 2,381,430 | Belluche | Aug. 7, 1945 |
| 2,425,680 | Kaddeland | Aug. 12, 1947 |
| 2,446,198 | Socke | Aug. 3, 1948 |
| 2,479,023 | Peyrebrune | Aug. 16, 1949 |
| 2,545,401 | Wixon et al. | Mar. 13, 1951 |
| 2,557,504 | Holmes | June 19, 1951 |
| 2,564,354 | Conner | Aug. 14, 1951 |
| 2,615,376 | Pelikan | Oct. 28, 1952 |
| 2,759,402 | Jedlick | Aug. 21, 1956 |
| 2,845,011 | Schilling | July 29, 1958 |

FOREIGN PATENTS

| | | |
|---|---|---|
| 14,194 | Great Britain | June 29, 1852 |